(12) United States Patent
Zhu et al.

(10) Patent No.: US 9,818,223 B2
(45) Date of Patent: *Nov. 14, 2017

(54) METHOD OF FORMING A FREEFORM SURFACE SHAPED ELEMENT FOR AN ILLUMINATION SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Xiao-Fei Wu, Beijing (CN); Wei Hou, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,861

(22) Filed: May 12, 2015

(65) Prior Publication Data

US 2015/0363973 A1    Dec. 17, 2015

(30) Foreign Application Priority Data

Jun. 13, 2014 (CN) .......................... 2014 1 0262951

(51) Int. Cl.
*G06T 17/20* (2006.01)
*G06T 17/30* (2006.01)
*G06F 17/10* (2006.01)

(52) U.S. Cl.
CPC .............. *G06T 17/30* (2013.01); *G06F 17/10* (2013.01)

(58) Field of Classification Search
USPC ................................................ 345/419, 421
See application file for complete search history.

(56) References Cited

U.S. PATENT DOCUMENTS 5,917,953 A * 6/1999 Ausbeck, Jr. ........... G06T 9/001
                                                      382/151
6,697,539 B1 * 2/2004 Dolan ................... G06T 3/4007
                                                      382/236

(Continued)

*Primary Examiner* — Kimbinh T Nguyen
(74) *Attorney, Agent, or Firm* — Steven Reiss

(57) ABSTRACT

A construction method of freeform surface shape based on XY-polynomial obtains a plurality of data points of a freeform surface according to an object point and an imaging point in a three-dimensional Cartesian coordinates system Oxyz. Each of the plurality of data points comprises a coordinate value $Q_i$ and a normal vector $N_i$. A first sum of squares $e_1(P)$ of coordinate differences in z direction between the coordinate value $Q_i$ and the freeform surface is applied, and by a second sum of squares $e_2(P)$ between the normal vector $N_i$ of the data points and a normal vector $n_i$ of the freeform surface, a modulus of vector differences is acquired. An evaluation function $f(p)=e_1(P)+we_2(P)$ is proposed and a plurality of freeform surface shapes obtained by selecting and applying different weightings. A final freeform surface shape $\Omega_{opt}$ is chosen from the plurality of freeform surface shapes.

8 Claims, 8 Drawing Sheets

(56) References Cited

U.S. PATENT DOCUMENTS

| | | | | |
|---|---|---|---|---|
| 7,023,432 | B2* | 4/2006 | Fletcher | G06T 17/20 345/419 |
| 7,619,749 | B2* | 11/2009 | Cheung | G06T 17/30 345/421 |
| 9,239,453 | B2* | 1/2016 | Cheng | G03B 21/00 |
| 2009/0228251 | A1* | 9/2009 | Cakmakci | G06T 17/30 703/2 |
| 2012/0081800 | A1* | 4/2012 | Cheng | G03B 21/00 359/720 |

* cited by examiner

```
┌─ 101
│ Obtain a plurality of data points of a freeform
│ surface according to an object point and an imaging
│ point corresponding to the object point in a
│ three-dimensional Cartesian coordinate system Oxyz,
│ wherein each of the plurality of data points comprises
│ a coordinate value $Q_i=(x_i, y_i, z_i)(i=1, 2, ..., n)$ and a
│ normal vector $N_i=(u_i, v_i, -1)(i=1, 2, ..., n)$, the
│ object point is imaged at the imaging point through
│ the freeform surface, and the freeform surface is
│ expressed as $z=f(x,y,P)=\sum_{i,j=0} P_{i,j} x^i y^j$
└─
        ↓
┌─ 102
│ Acquire a first sum of squares, which is represented
│ by a function $e_1(P)$, of coordinate differences in z
│ direction between the coordinate value $Q_i=(x_i, y_i, z_i)$
│ $(i = 1, 2, ..., n)$ and the freeform surface
└─
        ↓
┌─ 103
│ Acquire a second sum of squares, which is represented
│ by a function $e_2(P)$, of modulus of vector differences
│ between the normal vector $N_i=(u_i, v_i, -1)$
│ $(i = 1, 2, ..., n)$ of the plurality of data points and a
│ normal vector $n_i$ of the freeform surface
└─
        ↓
┌─ 104
│ Propose an evaluation function $f(P)=e_1(P)+we_2(P)$,
│ wherein w is a weighting greater than 0
└─
        ↓
┌─ 105
│ Select different weightings w and set a gradient $\nabla f(P)$
│ of the evaluation function equal to 0 to obtain a
│ plurality of different values of P and a plurality of
│ freeform surface shapes $z = f(x, y; P)$
│ corresponding to each of the plurality of different
│ values of P
└─
        ↓
┌─ 106
│ Choosing a final freeform surface shape $\Omega_{opt}$ which
│ has a best imaging quality from the plurality of
│ freeform surface shapes $z = f(x, y; P)$
└─
```

FIG. 1

METHOD OF FORMING A FREEFORM SURFACE SHAPED ELEMENT FOR AN ILLUMINATION SYSTEM

CROSS-REFERENCE TO RELATED APPLICATIONS

This application claims all benefits accruing under 35 U.S.C. §119 from China Patent Application No. 201410262951.6, filed on Jun. 13, 2014 in the China Intellectual Property Office, disclosure of which is incorporated herein by reference. This application is related to common-assigned application entitled, "DESIGN METHOD OF LED FREEFORM SURFACE ILLUMINATION SYSTEM BASED ON XY-POLYNOMIAL", filed Ser. No. 14/709,854.

BACKGROUND

1. Technical Field

The present disclosure relates to a construction method of freeform surface shape based on XY-polynomial.

2. Description of Related Art

In conventional design methods of freeform surface illumination system based on XY-polynomial, a plurality of data points (including coordinate values and normal vectors) of discrete points on a freeform surface are obtained through a differential equation method and then surface fitted by using a least square method to obtain a freeform surface. However, the conventional design methods may have a relatively large deviation in the normal vectors, corrupting the imaging quality.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 is a flowchart of one embodiment of a construction method of freeform surface shape based on XY-polynomial.

DETAILED DESCRIPTION

Figure 2:
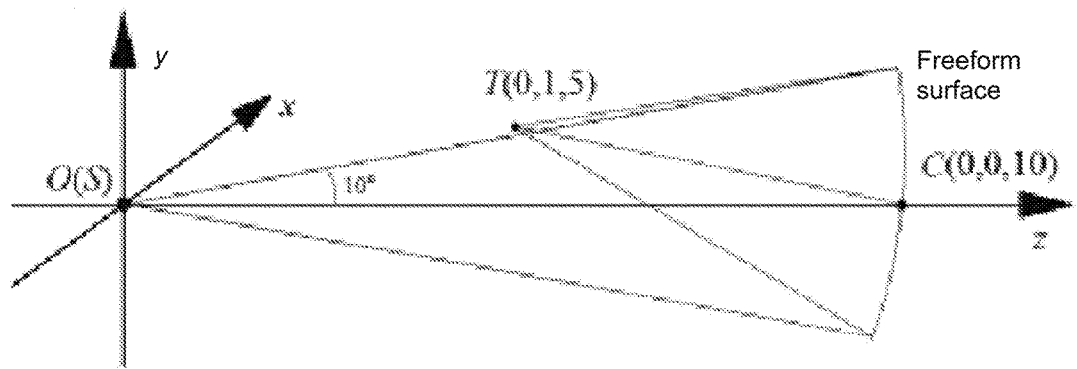
FIG. 2 is a schematic view showing one embodiment of the construction method of freeform surface shape based on XY-polynomial.
Figure 3:
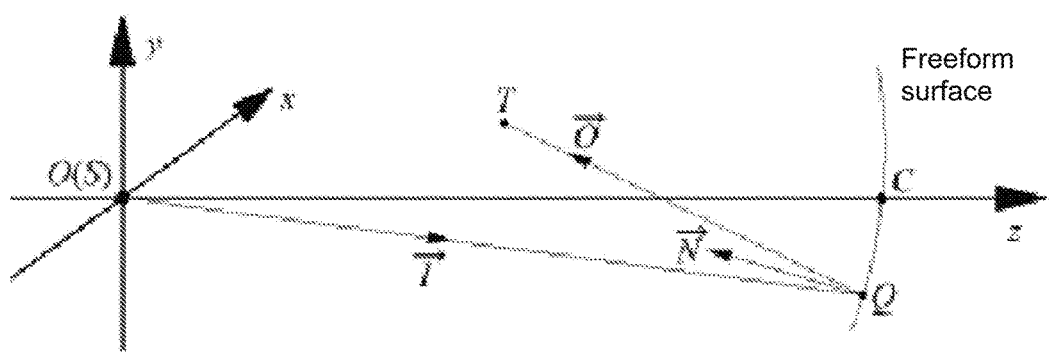
FIG. 3 is a schematic view showing another embodiment of the construction method of freeform surface shape based on XY-polynomial.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprise" or "comprising" when utilized, means "include or including, but not necessarily limited to"; it specifically indicates open-ended inclusion or membership in the so-described combination, group, series, and the like.

Referring to FIG. 1, a flowchart is presented in accordance with an embodiment of a construction method of freeform surface shape based on XY-polynomial by way of example, as there are a variety of ways to carry out the method. Each block shown in FIG. 1 represents one or more processes, methods, or subroutines carried out in the exemplary method. Additionally, the illustrated order of blocks is by example only and the order of the blocks can be changed. The exemplary method can begin at block 101. Depending on the embodiment, additional steps can be added, others removed, and the ordering of the steps can be changed.

At block 101, a plurality of data points of a freeform surface are obtained according to an object point and an imaging point corresponding to the object point, in a three-dimensional Cartesian coordinate system Oxyz. Each of the plurality of data points comprises a coordinate value $Q_i=(x_i, y_i, z_i)(i=1, 2, \ldots, n)$ and a normal vector $N_i=(u_i, v_i, -1)(i=1, 2, \ldots, n)$. The object point is imaged at the imaging point through the freeform surface. The freeform surface can be expressed in terms of the following equation:

$$z = f(x, y; P) = \sum_{i,j=0} P_{i,j} x^i y^j$$

At block 102, a first sum of squares is applied, which can be represented by a function $e_1(P)$, of coordinate differences in z direction between the coordinate value $Q_i=(x_i, y_i, z_i)(i=1, 2, \ldots, n)$ and the freeform surface. The first sum of squares $e_1(P)$ can be expressed in terms of the following equation:

$$e_1(P) = \sum_{i=1}^{n} [z_i - f(x_i, y_i; P)]^2 = (Z - A_1 P)^T (Z - A_1 P)$$

Wherein $$Z = \begin{bmatrix} z_1 & z_2 & \cdots & z_n \end{bmatrix}^T$$

$$A_1 = \begin{bmatrix} 1 & x_1 & y_1 & x_1^2 & x_1 y_1 & y_1^2 & x_1^3 & x_1^2 y_1 & x_1 y_1^2 & y_1^3 & \cdots \\ 1 & x_2 & y_2 & x_2^2 & x_2 y_2 & y_2^2 & x_2^3 & x_2^2 y_2 & x_2 y_2^2 & y_2^3 & \cdots \\ & & & \cdots & & & \cdots & & \cdots & & \\ 1 & x_n & y_n & x_n^2 & x_n y_n & y_n^2 & x_n^3 & x_n^2 y_n & x_n y_n^2 & y_n^3 & \cdots \end{bmatrix}$$

$$P = \begin{bmatrix} P_{00} & P_{10} & P_{01} & P_{20} & P_{11} & P_{02} & P_{30} & P_{21} & P_{12} & P_{03} & \cdots \end{bmatrix}^T$$

At block 103, a second sum of squares is applied, which can be represented by a function $e_2(P)$, of modulus of vector differences between the normal vector $N_i=(u_i, v_i, -1)$ (i=1, 2, ..., n) of the data points and a normal vector $n_i$ of the freeform surface. The second sum of squares $e_2(P)$ can be expressed in terms of the following equation:

$$e_2(P) = \sum_{i=1}^{n} [N_i - n_i]^2 = \sum_{i=1}^{n} \{[u_i - f_x(x_i, y_i; P)]^2 + [v_i - f_y(x_i, y_i; P)]^2\} = (U - A_2 P)^T (U - A_2 P) + (V - A_3 P)^T (V - A_3 P)$$

Wherein $n_i(f_x(x, y; P), f_y(x, y; P), -1)$ $U = \begin{bmatrix} u_1 & u_2 & \cdots & u_n \end{bmatrix}^T$ $V = \begin{bmatrix} v_1 & v_2 & \cdots & v_n \end{bmatrix}^T$ $$A_2 = \begin{bmatrix} 0 & 1 & 0 & 2x_1 & y_1 & 0 & 3x_1^2 & 2x_1 y_1 & y_1^2 & 0 & 4x_1^3 & 3x_1^2 y_1 & 2x_1 y_1^2 & y_1^3 & 0 & \cdots \\ 0 & 1 & 0 & 2x_2 & y_2 & 0 & 3x_2^2 & 2x_2 y_2 & y_2^2 & 0 & 4x_2^3 & 3x_2^2 y_2 & 2x_2 y_2^2 & y_2^3 & 0 & \cdots \\ & & & & \cdots & & & \cdots & & & & \cdots & & & & \\ 0 & 1 & 0 & 2x_n & y_n & 0 & 3x_n^2 & 2x_n y_n & y_n^2 & 0 & 4x_n^3 & 3x_n^2 y_n & 2x_n y_n^2 & y_n^3 & 0 & \cdots \end{bmatrix}$$

$$A_3 = \begin{bmatrix} 0 & 0 & 1 & 0 & x_1 & 2y_1 & 0 & x_1^2 & 2x_1 y_1 & 3y_1^2 & 0 & x_1^3 & 2x_1^2 y_1 & 3x_1 y_1^2 & 4y_1^3 & 0 & \cdots \\ 0 & 0 & 1 & 0 & x_2 & 2y_2 & 0 & x_2^2 & 2x_2 y_2 & 3y_2^2 & 0 & x_2^3 & 2x_2^2 y_2 & 3x_2 y_2^2 & 4y_2^3 & 0 & \cdots \\ & & & & \cdots & & & \cdots & & & & \cdots & & & & & \\ 0 & 0 & 1 & 0 & x_n & 2y_n & 0 & x_n^2 & 2x_n y_n & 3y_n^2 & 0 & x_n^3 & 2x_n^2 y_n & 3x_n y_n^2 & 4y_n^3 & 0 & \cdots \end{bmatrix}$$

At block 104, an evaluation function $f(P)=e_1(P)+we_2(P)$ is applied, wherein w is a weighting greater than 0.

At block 105, different weightings w are selected, and then a gradient $\nabla f(P)$ of the evaluation function $f(P)$ is set equal to 0 to obtain a plurality of different values of P and a plurality of freeform surface shapes z=f(x, y; P) corresponding to each of the plurality of different values of P.

At block 106, a final freeform surface shape $\Omega_{opt}$ which has a best imaging quality is chosen from the plurality of freeform surface shapes z=f(x, y; P).

Referring to FIG. 2, in one embodiment, an object point S is set as an origin O, and the three-dimensional Cartesian coordinate system Oxyz is constructed. The freeform surface intersects with the z axis at C=(0, 0, 10 mm), that is, f(0, 0)=10 mm. A cone beam is emitted from the object point S and centered on the +z axis with one half of an angular aperture being 10°. The cone beam is reflected by the freeform surface, and the reflected beam converges at an imaging point T=(0, 1 mm, 5 mm).

The plurality of data points can be obtained through a differential equation method or through other methods. In one embodiment, the plurality of data points is obtained through the differential equation method.

Firstly, the three-dimensional Cartesian coordinate system Oxyz can be transformed to a spherical coordinate system wherein the object point S is at the center, a first direction having zenith angle $\phi=0$ is extended along a positive direction of the z axis, a second direction having azimuth angle $\theta=0$ is extended along a positive direction of the x axis, and a direction having azimuth angle $\theta=\pi/2$ is extended along a positive direction of the y axis. The plurality of freeform surface shapes z=f(x, y; P) can be transformed to a plurality of freeform surface shapes $\Omega'$: $\rho=\rho(\theta, \phi)$, wherein $\rho(\theta, 0)=10$ mm. Thus, coordinates of the object point S, coordinates of a incidence point Q, and coordinates of the imaging point T can be respectively obtained as follows:

$S=(S_x, S_y, S_z)=(0,0,0)$ $Q=(Q_x, Q_y, Q_z)=(\rho \sin\phi \cos\theta, \rho \sin\phi \sin\theta, \rho \cos\phi)$ $T=(T_x, T_y, T_z)=(0,1 \text{ mm}, 5 \text{ mm})$ Furthermore, referring to FIG. 2, according to the coordinates of the object point S, the coordinates of the incidence point Q, and the coordinates of the imaging point T, a unit direction vector $\vec{I}$ of incident light and a unit direction vector $\vec{O}$ of reflected light can be respectively obtained as follows:

$$\vec{I} = (I_x, I_y, I_z) = \frac{Q - S}{|Q - S|}$$

$$\vec{O} = (O_x, O_y, O_z) = \frac{T - Q}{|T - Q|}$$

Based on an object-image relationship, a set of partial differential equations of the plurality of freeform surface shapes $\Omega'$: $\rho=\rho(\theta, \phi)$ in the spherical coordinate system is thus obtained, as follows:

$$\begin{cases} \dfrac{\partial \rho}{\partial \varphi} = f_1(\rho, \theta, \varphi) = \rho(\theta, \varphi) \times \dfrac{\sin\varphi \times (O_z - I_z) - \cos\varphi \times A}{\cos\varphi \times (O_z - I_z) + \sin\varphi \times A} \\ \dfrac{\partial \rho}{\partial \theta} = f_2(\rho, \theta, \varphi) = \rho(\theta, \varphi) \times \sin\varphi \times \dfrac{\sin\theta \times (O_x - I_x) - \cos\theta \times (O_y - I_y)}{\cos\varphi \times (O_z - I_z) + \sin\varphi \times A} \end{cases}$$

Wherein:

$$A = \sin\theta \times (O_y - I_y) + \cos\theta \times (O_x - I_x)$$

Finally, with limitations of initial conditions $\rho(\theta, 0) = 10$ mm and a maximum zenith angle $\phi_{max} = 10°$, a plurality of numerical solutions $(\rho_i, \theta_i, \phi_i)(i=1, 2, \ldots, n)$ of the set of partial differential equations of the plurality of freeform surface shapes $\Omega'$: $\rho = \rho(\theta, \phi)$ are realized through a numerical method. The coordinates value $Q_i = (x_i, y_i, z_i)$ $(i=1, 2, \ldots, n)$ of the plurality of data points of the freeform surface are obtained by transforming the plurality of numerical solutions from the spherical coordinate system to the three-dimensional Cartesian coordinate system Oxyz. A set of partial differential equations of a plurality of freeform surface shapes $\Omega$: $z = f(x, y)$ in the three-dimensional Cartesian coordinate system Oxyz is as follows:

$$\begin{cases} \dfrac{\partial z}{\partial x} = -\dfrac{O_x - I_x}{O_z - I_z} \\ \dfrac{\partial z}{\partial y} = -\dfrac{O_y - I_y}{O_z - I_z} \end{cases}$$

Substitute $Q_i = (x_i, y_i, z_i)(i=1, 2, \ldots, n)$ into the set of partial differential equations of the freeform surface shape $\Omega$: $z = f(x, y)$. The normal vector $N_i$ of the plurality of data points is obtained as follows:

$$N_i = \left( \dfrac{\partial z}{\partial x}, \dfrac{\partial z}{\partial y}, -1 \right) \bigg|_{Q_i} \quad (i = 1, 2, \ldots, n)$$

To satisfy both calculation accuracy and convenience, in one embodiment, a third order XY-polynomial curved surface, a fourth order XY-polynomial curved surface, or a fifth order XY-polynomial curved surface are used as a prototype of the freeform surface. In one embodiment, the fifth order XY-polynomial curved surface is used as the prototype, wherein $$Z = f(x, y) = 10 + P_{01}y + P_{20}x^2 + P_{02}y^2 + P_{21}x^2y + P_{03}y^3 + P_{40}x^4 + P_{22}x^2y^2 + P_{04}y^4 + P_{41}x^4y + P_{23}x^2y^3 + P_{05}y^5$$

The evaluation function $f(P)$ is used to establish a comprehensive evaluation index to investigate and evaluate $e_1(P)$ and $e_2(P)$.

When the gradient $\nabla f(P)$ is 0, the evaluation function $f(P)$ can be minimal. When the evaluation function $f(P)$ is minimal, $e_1(P)$ and $e_2(P)$ can both be restricted. When $$\nabla f(P) = 2(A_1^T A_1 P - A_1^T Z) + 2w(A_2^T A_2 P - A_2^T U) + 2w(A_3^T A_3 P - A_3^T V) = 0,$$

$$P = (A_1^T A_1 + wA_2^T A_2 + wA_3^T A_3)^{-1}(A_1^T Z + wA_2^T U + wA_3^T V).$$

The final freeform surface shape $\Omega_{opt}$ can be achieved by obtaining radii of gyration of defocused spots of the different freeform surface shapes $z = f(x, y; P)$, and selecting one of the plurality of freeform surface shapes $z = f(x, y; P)$ having a minimum radius of gyration of a defocused spot, as the final freeform surface shape $\Omega_{opt}$.

Figure 4:
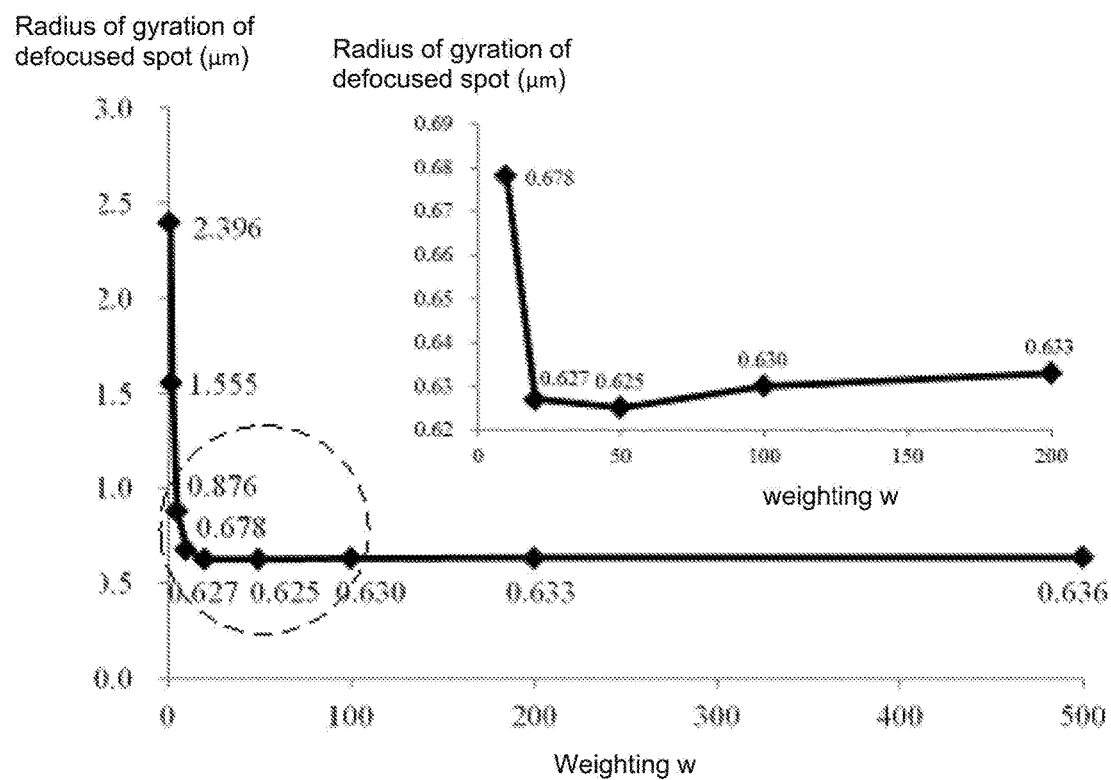
FIG. 4 shows a graph and partially enlarged view of radii of gyration of defocused spots of a plurality of freeform surface shapes z=f(x, y; P) with different weightings in one embodiment of the construction method of freeform surface shape based on XY-polynomial.
Figure 5:
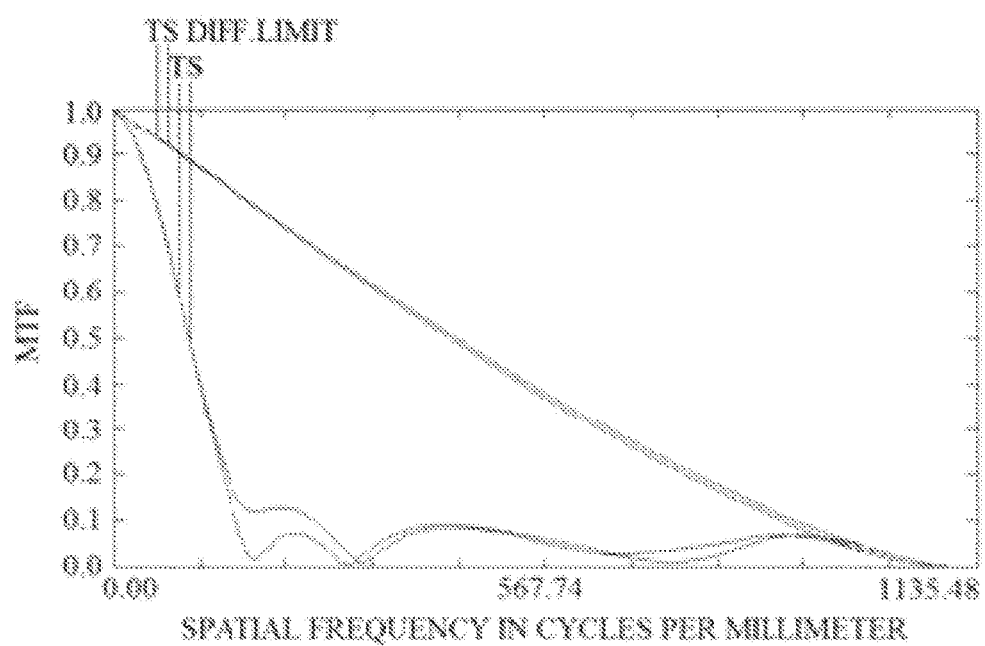
FIG. 5 shows a modulation transfer function (MTF) curve of a freeform surface shape z=f(x, y; P) with a weighting of 1, in the embodiment of the construction method of freeform surface shape based on XY-polynomial.
Figure 6:
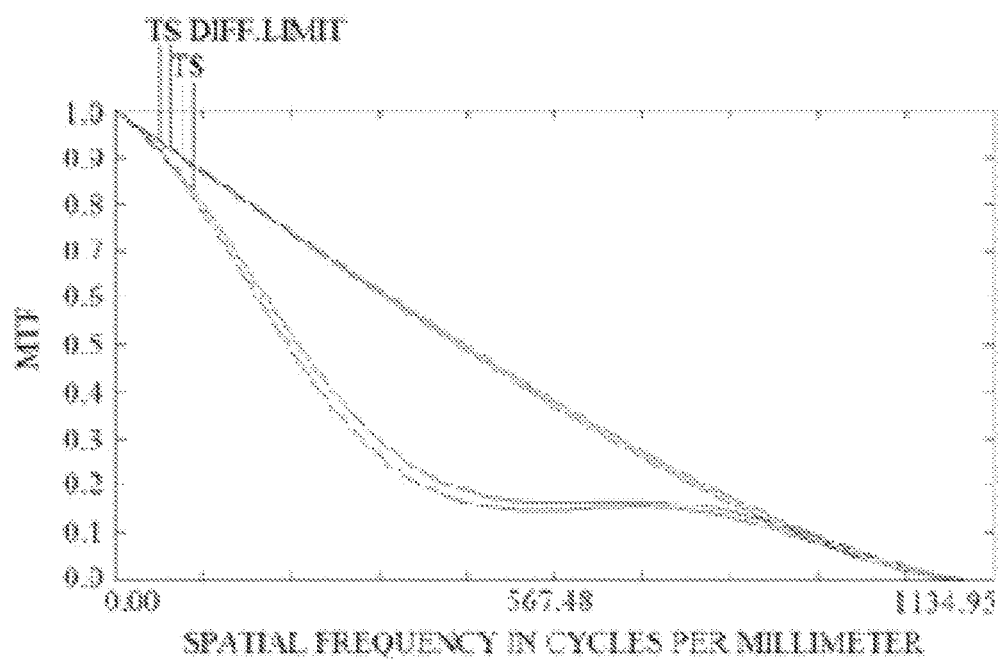
FIG. 6 shows a modulation transfer function (MTF) curve of a freeform surface shape z=f(x, y; P) with a weighting of 5, in the embodiment of the construction method of freeform surface shape based on XY-polynomial.
Figure 7:
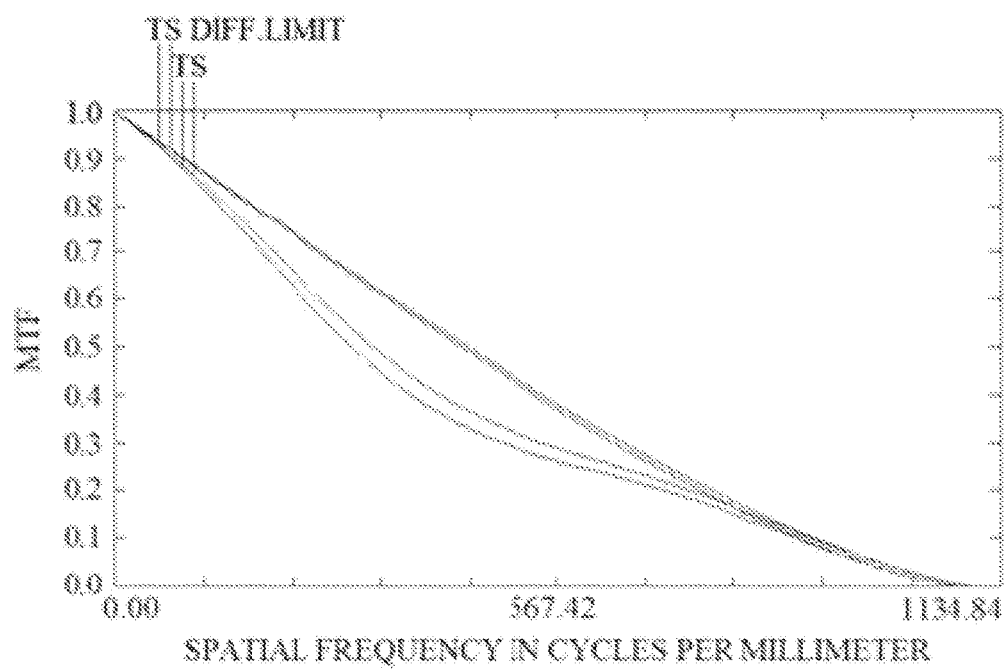
FIG. 7 shows a modulation transfer function (MTF) curve of a freeform surface shape z=f(x, y; P) with a weighting of 10, in the embodiment of the construction method of freeform surface shape based on XY-polynomial.
Figure 8:
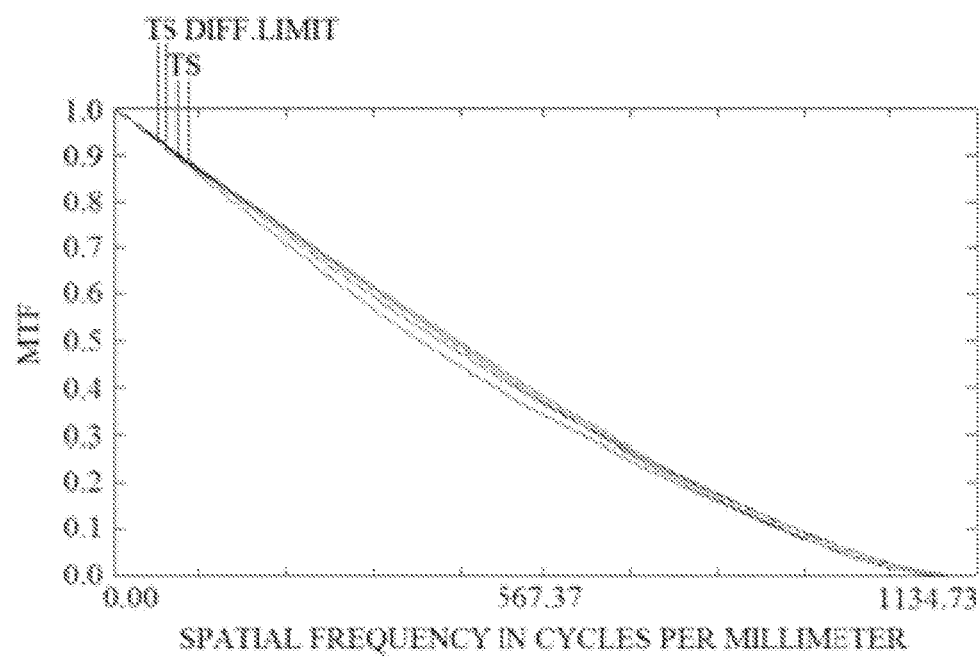
FIG. 8 shows a modulation transfer function (MTF) curve of a freeform surface shape z=f(x, y; P) with a weighting of 50, in the embodiment of the construction method of freeform surface shape based on XY-polynomial.

Referring to FIG. 4, FIG. 4 shows a graph and its partially enlarged view of radii of gyration of defocused spots of the plurality of freeform surface shapes $z = f(x, y; P)$ with the weighting w sequentially equal to 1, 2, 5, 10, 20, 50, 100, 200 and 500. It can be seen that when w is 50, a freeform surface shape $z = f(x, y; P)$ has the minimum radius of gyration of the defocused spot at about 0.625 μm.

Referring to FIGS. 5~8, FIGS. 5~8 respectively show modulation transfer function (MTF) curves of the plurality of freeform surface shapes $z = f(x, y; P)$ with the weighting w equal to 1, 5, 10, and 50. It can be seen that when w is 50, the freeform surface shape $z = f(x, y; P)$ has the best imaging quality.

In the present method, the coordinates value and the normal vector of each data point are investigated hypothetically. The coordinates value and the normal vector of the freeform surfaces can be satisfied at different levels simultaneously. Any deviations of the coordinates value and deviations of the normal vector of the freeform surfaces can be controlled within an acceptable range. Thus, a high imaging quality can be obtained.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of forming a freeform surface shaped element for an illumination system comprising:

step (S1), obtaining a plurality of data points of a freeform surface according to an object point and an imaging point corresponding to the object point, in a three-dimensional Cartesian coordinate system Oxyz, wherein each of the plurality of data points comprises a coordinate value $Q_i = (x_i, y_i, z_i)(i=1, 2, \ldots, n)$ and a normal vector $N_i = (u_i, v_i, -1)(i=1, 2, \ldots, n)$, the object point is imaged at the imaging point through the freeform surface, and the freeform surface is expressed as $$z = f(x, y; P) = \sum_{i,j=0} P_{i,j} x^i y^j;$$

step (S2), acquiring a first sum of squares $e_1(P)$, of coordinate differences in z direction between the coordinate value $Q_i = (x_i, y_i, z_i)(i=1, 2, \ldots, n)$ and the freeform surface, wherein the first sum of squares $e_1(P)$ is expressed in terms of a first equation:

$$e_1(P) = \sum_{i=1}^{n} [z_i - f(x_i, y_i; P)]^2 = (Z - A_1 P)^T (Z - A_1 P),$$

wherein $$Z = [z_1 \quad z_2 \quad \ldots \quad z_n]^T,$$

$$A_1 = \begin{bmatrix} 1 & x_1 & y_1 & x_1^2 & x_1 y_1 & y_1^2 & x_1^3 & x_1^2 y_1 & x_1 y_1^2 & y_1^3 & \ldots \\ 1 & x_2 & y_2 & x_2^2 & x_2 y_2 & y_2^2 & x_2^3 & x_2^2 y_2 & x_2 y_2^2 & y_2^3 & \ldots \\ & \ldots & & & \ldots & & & \ldots & & & \\ 1 & x_n & y_n & x_n^2 & x_n y_n & y_n^2 & x_n^3 & x_n^2 y_n & x_n y_n^2 & y_n^3 & \ldots \end{bmatrix},$$

$$P = [P_{00} \quad P_{10} \quad P_{01} \quad P_{20} \quad P_{11} \quad P_{02} \quad P_{30} \quad P_{21} \quad P_{12} \quad P_{03} \quad \ldots]^T;$$

step (S3), acquiring a second sum of squares $e_2(P)$, of modulus of vector differences between the normal vector $N_i=(u_i, v_i, -1)$ ($i=1, 2, \ldots, n$) of the plurality of data points and a normal vector $n_i$ of the freeform surface, wherein the second sum of squares $e_2(P)$ is expressed in terms of a second equation:

$$e_2(P) = \sum_{i=1}^{n} \lceil N_i - n_i \rceil^2 = \sum_{i=1}^{n} \{[u_i - f_x(x_i, y_i; P)]^2 + [v_i - f_y(x_i, y_i; P)]^2\} =$$
$$(U - A_2 P)^T (U - A_2 P) + (V - A_3 P)^T (V - A_3 P)$$

wherein $n_i(f_x(x, y; P), f_y(x, y; P), -1)$, $U = [u_1 \quad u_2 \quad \ldots \quad u_n]^T,$ $V = [v_1 \quad v_2 \quad \ldots \quad v_n]^T,$ $A_2 =$ $$\begin{bmatrix} 0 & 1 & 0 & 2x_1 & y_1 & 0 & 3x_1^2 & 2x_1 y_1 & y_1^2 & 0 & 4x_1^3 & 3x_1^2 y_1 & 2x_1 y_1^2 & y_1^3 & 0 & \ldots \\ 0 & 1 & 0 & 2x_2 & y_2 & 0 & 3x_2^2 & 2x_2 y_2 & y_2^2 & 0 & 4x_2^3 & 3x_2^2 y_2 & 2x_2 y_2^2 & y_2^3 & 0 & \ldots \\ & & & \ldots & & & & \ldots & & & & \ldots & & & & \\ 0 & 1 & 0 & 2x_n & y_n & 0 & 3x_n^2 & 2x_n y_n & y_n^2 & 0 & 4x_n^3 & 3x_n^2 y_n & 2x_n y_n^2 & y_n^3 & 0 & \ldots \end{bmatrix},$$

$A_3 =$ $$\begin{bmatrix} 0 & 0 & 1 & 0 & x_1 & 2y_1 & 0 & x_1^2 & 2x_1 y_1 & 3y_1^2 & 0 & x_1^3 & 2x_1^2 y_1 & 3x_1 y_1^2 & 4y_1^3 & 0 & \ldots \\ 0 & 0 & 1 & 0 & x_2 & 2y_2 & 0 & x_2^2 & 2x_2 y_2 & 3y_2^2 & 0 & x_2^3 & 2x_2^2 y_2 & 3x_2 y_2^2 & 4y_2^3 & 0 & \ldots \\ & & & & \ldots & & & & \ldots & & & & \ldots & & & & \\ 0 & 0 & 1 & 0 & x_n & 2y_n & 0 & x_n^2 & 2x_n y_n & 3y_n^2 & 0 & x_n^3 & 2x_n^2 y_n & 3x_n y_n^2 & 4y_n^3 & 0 & \ldots \end{bmatrix};$$

step (S4), proposing an evaluation function $f(p)=e_1(P)+we_2(P)$, wherein w is a weighting greater than 0;

step (S5), selecting different weightings w and setting a gradient $\nabla f(P)$ of the evaluation function equal to 0, to obtain a plurality of different values of P and a plurality of freeform surface shapes $z=f(x, y; P)$ corresponding to each of the plurality of different values of P;

step (S6), choosing a freeform surface shape Ωopt which has a best imaging quality from the plurality of freeform surface shapes $z=f(x, y; P)$; and step (S7), processing an element in accordance with the freeform surface shape Ωopt to obtain the freeform surface shaped element for the illumination system.

2. The method of claim 1, wherein the plurality of data points are obtained through a differential equation method.

3. The method of claim 1, wherein the gradient $\nabla f(P)$ of the evaluation function $f(P)$ satisfies the following equation:

$$\nabla f(P) = 2(A_1^T A_1 P - A_1^T Z) + 2w(A_2^T A_2 P - A_2^T U) + 2w(A_3^T A_3 P - A_3^T V).$$

4. The method of claim 1, wherein the XY-polynomial is a third order XY-polynomial, a fourth order XY-polynomial or a fifth order XY-polynomial.

5. The method of claim 1, wherein the step (S6) further comprises:

obtaining radii of gyration of defocused spots of the plurality of freeform surface shapes $z=f(x, y; P)$; and selecting one of the plurality of freeform surface shapes $z=f(x, y; P)$ having a minimum radius of gyration of a defocused spot as the final freeform surface shape Ωopt.

6. The method of claim 1, wherein the object point is set as an origin O to construct the three-dimensional Cartesian coordinate system Oxyz, the freeform surface intersects with z axis at (0, 0, 10 mm), a cone beam is emitted from the object point and centered on +z axis with one half of an angular aperture being 10°, and the cone beam is reflected by the freeform surface and then converges at the imaging point (0, 1 mm, 5 mm), and the freeform surface is expressed as:

$$Z=f(x,y)=10+P_{01}y+P_{20}x^2+P_{02}y^2+P_{21}x^2y+P_{03}y^3+P_{40}x^4+P_{22}x^2y^2+P_{04}y^4+P_{41}x^4y+P_{23}x^2y^3+P_{05}y^5.$$

7. The method of claim 6, wherein the weighting w is selected from 1, 2, 5, 10, 20, 50, 100, 200 and 500.

8. The method of claim 7, wherein when the weighting w is 50, a freeform surface shape $z=f(x, y; P)$ has a minimum radius of gyration of a defocused spot of 0.625 μm.

* * * * *